United States Patent Office 2,722,499
Patented Nov. 1, 1955

2,722,499

DEWAXING PROCESS

Robert L. Weeks, Union, N. J., assignor to Esso Research and Engineering Company, a corporation of Delaware No Drawing. Application June 19, 1951,
Serial No. 232,449

1 Claim. (Cl. 196—19)

This invention relates to the separation of waxy constituents from residual oils and more specifically to an improved method for effecting such separation by filtration without blinding or fouling the filter cloth.

Hydrocarbon oils contain solid waxy constituents which may be removed by dilution and chilling of the oil, which causes the wax to solidify, and by mechanical separation. The separation may be effected by settling, by filtration, or by centrifuging. There are two types of these waxy hydrocarbon oils generally encountered. These are the distillate and residual stocks. By a residual stock is meant a bright stock or a cylinder stock made by deasphalting the pitch bottoms from a vacuum pipe still. This material has a boiling range from 1000° F. up at atmospheric pressure and has good filtering characteristics, i. e. it has a good filter rate and the wax cake has a low oil content.

When distillate stocks are subjected to this dewaxing treatment, the separation has often been found to be slow and difficult due apparently to the presence of large amounts of large crystals which form a spongy mass which holds up and absorbs a large amount of the liquid. There is no particular problem of filtration involved. Liquid which is not absorbed by the spongy mass passes easily through the filter cloth. The problem has been overcome, however, by the use of various filter aids. A particularly important class of filter aids for this purpose are those compounds which act to reduce the size of the wax crystals so that they no longer cover the filter with a spongy mass. These are known to the art as pour depressors. Product rate can be increased several fold by this method.

When residual stocks are treated in the same manner as the distillate stocks to separate the wax, very great difficulties have been encountered when attempts have been made to separate the wax by filtration because of the gradual accumulation of fine crystals in the interstices of the filter cloth. The filtration rate through the partially blinded filter cloth is decreased thus further reducing the overall average filtration capacity. These crystals are not removed from the cloth at the time of cake discharge and their gradual accumulation increases the pressure drop across the filter cloth thus decreasing filter rate. After long periods of filtration, the filter rate often decreases to such an extent that it is necessary to suspend filtration operations and wash the filter cloth either with hot solvent or hot kerosene to melt and dissolve the accumulation of fine wax crystals. Thus, valuable filtration time is lost and the product may be undesirably contaminated with kerosene.

It has now been surprisingly discovered that the pour depressor type of filter aids used for distillate stocks to reduce the crystal size and prevent the formation of an absorbent spongy mass are also eminently suitable in preventing the blinding of filter cloths by fine crystals. This discovery is surprising in that the function of the pour depressor type of filter aid when used with distillate stocks is to reduce crystal size. Accordingly it would not be expected to overcome difficulties encountered when the crystal size is already small. According to this invention, however, .01 to 0.1% by weight of this type of filter aid is very beneficial in increasing filter rates.

A particularly suitable type of filter aid for this purpose is the pour depressant known as Paraflow which is prepared by the condensation of chlorinated paraffin wax and an aromatic hydrocarbon, such as naphthalene, in the presence of aluminum chloride as shown for example in U. S. Patents 2,008,674, 1,815,022, 2,087,682 and 2,297,292.

It will be understood that the waxy oil should be diluted in order to make the separation easier in the usual way, and as the diluent may be selected by any one of a great many known materials. As examples of suitable diluents, the liquefied normally gaseous hydrocarbons may be mentioned, such as propane or butane or the corresponding olefins, used alone or admixed with each other or with ethane, ethylene or amylene and the like. Naphthas may also be used as well as liquid aromatic hydrocarbons such as benzol, toluol or xylol. Another class of diluents is the broad class of oxygen-containing liquid organic substances. These materials fall broadly within the class of the lower alcohols, ethers, esters, ketones, aldehydes and acids. Many of these substances are well known as wax precipitants and they may be used alone in some cases or preferably when admixed with solvents of the class of naphthas, liquid aromatic hydrocarbons or chlorinated hydrocarbons, such as carbon tetrachloride or trichlorethylene. Among the particular alcohols which are desirable may be mentioned ethyl, methyl, propyl and butyl alcohols, also amyl alcohol. The latter of these may be used alone but it is preferable to use the former either with naphtha or a liquid aromatic hydrocarbon. Methyl or ethyl or methyl-ethyl ethers or any of the other ethers corresponding to the above mentioned alcohols may be used. The esters which are most desirable are the formates or acetates; for example, methyl or ethyl formate, the propyl, butyl or amyl acetates. Acetones, di-ethyl and di-methyl or ethyl-methyl ketones may be used, and are preferably admixed with liquid aromatic hydrocarbons. It will be understood that these particular diluents are not new in the art but in each case there is believed to be an active cooperation between the diluent and the separation aid which makes a more rapid separation possible, together with a greater yield of oil and a better quality of wax.

The amount of the diluent used varies with the particular one employed, but in general they are used in proportions of from 1 to 4 volumes of the diluent or solvent to 1 volume of the waxy oil. The diluted waxy oil mixture to which the separation aid is added is cooled to solidify the wax and the rate of chilling may be slow, as is now the practice, but it is found that the rate may be greatly increased when the separation aid is present; for example, it may be in excess of 10 or even 25° F. per minute and still produce a readily separable wax. The chilling may be sufficiently rapid to be described as "shock" chilling.

The following example illustrates the beneficial results obtained in accordance with this invention:

Example

A waxy residual oil was dewaxed by diluting with propane and chilling to —35° F. to precipitate the wax. The wax was separated from the resulting mixture by passing the mixture through a rotary filter with and without the addition of a concentrate of Paraflow in lubricating oil with the following results:

|  | No Paraflow | 0.05% (0.015%) (Pure) by vol. of Paraflow Concentrate |
|---|---|---|
| Waxy oil Feed Rate, bls./day | 2,230 | 2,500 |
| No. of Filters operating | 5 | 4 |
| Hot washes/filter/day | 11 | 5 |
| Dewaxed oil yield, vol. percent | 71.7 | 71.9 |

The above data show a decrease in the required number of hot washes/filter/day from 11 with no Paraflow to 5 when using .015% of Paraflow. In addition the feed rate per filter was increased by about 40% and there was no decrease in the yield of dewaxed oil.

The nature of the present invention having been thus fully set forth and specific examples of the same given, what is claimed as new and useful and desired to be secured by Letters Patent is:

In a process for separating waxy constituents from waxy residual oil including the steps of diluting the oil with liquefied propane and thereafter evaporating a portion of the propane so as to chill the diluted oil and to solidify wax within the oil, the improvement which comprises incorporating about 0.015% by weight of a compound consisting of the condensation product of chlorinated wax and naphthalene to the diluted oil, evaporating the propane at a rate so as to chill the diluted oil and added condensation product at a rate greater than 10° F. per minute to solidify the wax, and thereafter filtering the solidified wax from the diluted oil.

References Cited in the file of this patent

UNITED STATES PATENTS

| 1,988,706 | Swift | Jan. 22, 1935 |
| 2,081,519 | Wade | May 25, 1937 |
| 2,085,519 | Verver | June 29, 1937 |
| 2,098,007 | Mapes et al. | Nov. 2, 1937 |
| 2,178,328 | Story | Oct. 31, 1939 |